United States Patent [19]
Shimizu

[11] Patent Number: 5,223,854
[45] Date of Patent: Jun. 29, 1993

[54] APPARATUS FOR AND METHOD OF RECORDING AN IMAGE WITH MEANS FOR FEEDING A MATERIAL

[75] Inventor: Yoshio Shimizu, Kyoto, Japan

[73] Assignee: Dainippon Screen Mfg. Co., Ltd., Kyoto, Japan

[21] Appl. No.: 706,704

[22] Filed: May 29, 1991

[30] Foreign Application Priority Data

Jun. 15, 1990 [JP] Japan .................................. 2-157820

[51] Int. Cl.$^5$ ............................................ G01D 9/00
[52] U.S. Cl. ........................................ 346/24; 226/113; 346/134; 355/309; 355/310
[58] Field of Search ................. 346/24, 134, 136; 355/203, 208, 308, 309, 310, 311, 316, 321, 28, 29; 83/176; 226/113, 114

[56] References Cited

U.S. PATENT DOCUMENTS

| | | | |
|---|---|---|---|
| 3,665,486 | 5/1972 | Sato | 355/28 X |
| 3,951,023 | 4/1976 | Ashburner | 226/113 X |
| 4,415,255 | 11/1983 | Huber et al. | 355/310 X |
| 4,939,539 | 7/1990 | Shigaki | |
| 5,153,661 | 10/1992 | Shimizu et al. | 355/309 |

FOREIGN PATENT DOCUMENTS

0200976A1 11/1986 European Pat. Off.
3435884A1 4/1985 Fed. Rep. of Germany.
63-071061 3/1988 Japan.

OTHER PUBLICATIONS

European Search Report.

Primary Examiner—A. T. Grimley
Assistant Examiner—William J. Royer
Attorney, Agent, or Firm—Lowe, Price, LeBlanc & Becker

[57] ABSTRACT

A travel roller moves between the initial and the end points in a loosening unit while supporting a photosensitive material to thereby form a loop thereof. A first sensor, for detecting that the travel roller locates on the end point, is provided in the loosening unit. When it is not detected at the end of recording that the travel roller locates on the end point, a portion of the photosensitive material is cut off, whereby the photosensitive material is divided into a sheet with a reproduced image and an unexposed photosensitive material. The unexposed photosensitive material is rewound until a leading edge portion thereof reaches a recording unit, and then an image to be reproduced next is recorded onto the unexposed photosensitive material.

8 Claims, 13 Drawing Sheets

APPARATUS FOR AND METHOD OF RECORDING AN IMAGE WITH MEANS FOR FEEDING A MATERIAL

BACKGROUND OF THE INVENTION

1. Field of The Invention

The present invention relates to an image recording apparatus, e.g., a color scanner, for recording an image to be reproduced onto a photosensitive material. In an image recording apparatus according to the present invention, a photosensitive material is pulled out of a roll containing the same and fed in the feeding direction while scanned with a laser beam which sweeps in a direction approximately perpendicular to the feeding direction of the photosensitive material. The present invention also relates to a method of recording an image.

2. Description of The Prior Art

In such an image recording apparatus as above to which the present invention is directed, the following is a common practice: A photosensitive material pulled out of a film case is fed in a feed scanning direction by rotation of a main roller while firmly holding the photosensitive material between the main roller and nip rollers. The image recording apparatus comprises an expose-scanning unit for sweeping a laser beam in a primary scanning direction synchronously with feed of The photosensitive material in the feed scanning direction, whereby an image to be reproduced is recorded on the photosensitive material. The photosensitive material with an exposed portion is further fed by a predetermined length in the feed scanning direction, to be automatically cut off by a cutter unit disposed in the image recording apparatus. Thus, a predetermined-size sheet with the image reproduced thereon is produced.

A general knowledge in the art is that it is highly required to attain not only stable but also smooth feed in feeding a photosensitive material in the feed scanning direction in order to assure the reproduced image of excellent quality. Unfortunately, a conventional apparatus has a weakness in this regard. As mentioned above, a photosensitive material is drawn out of the film case by rotation of the main roller to be fed. At the same time, the photosensitive material is kept firmly held between a pair of introduction rollers. This would cause tension to act upon the photosensitive material, which is now on the main roller, in the opposite direction to the feed scanning direction. Such tension would in turn cause the photosensitive material to slip between the main roller and the nip rollers. And this would then follow, if not always, that the photosensitive material is fed with unstable feed. In addition, force requisite for pulling out the photosensitive material from the roll thereof varies depending on amount of the photosensitive material remaining in the roll. Hence, amount of remaining photosensitive material in the roll is considered to exert significant influence on feed of the photosensitive material.

Various techniques have been established which solve such problems. Among those is the technique disclosed in Japanese Laid-Open Gazette No. 63-71061.

FIG. 1 is a sectional view of an image recording apparatus disclosed in the gazette No. 63-71061. In FIG. 1, introduction rollers 101, holding a leading edge portion of a photosensitive material roll 105, rotates to draw a photosensitive material 103 out of the roll 105 into a contacting area between a main roller 102 and nip rollers 106. The main roller 102 then rotates while firmly holding the photosensitive material 103 in its contacting area with the nip rollers 106, consequently feeding in a feed scanning direction the photosensitive material 103 on which a laser beam 104 runs in a primary scanning direction concurrently with the feed. As a result of this, an image to be reproduced can be recorded on the photosensitive material 103. In the image recording apparatus, a portion of the photosensitive material 103 is loosened between the introduction rollers 101 and the main roller 102 by a predetermined length, and the leading edge portion 102a, which has exposed, is let down. This allows an image to be recorded onto the photosensitive material 103 while preventing the same from slipping on the main roller 102.

After recording of the image, the main roller 102 reversely rotates to wind the photosensitive material 103. Then, the main roller 102 rotates again in its normal direction, to thereby send the photosensitive material 103 by a predetermined distance toward a cutter 107 and guide rolls 108, where the photosensitive material 103 would be cut off. Thus, a photosensitive material sheet of a predetermined length is produced, the sheet having the reproduced image.

The image recording apparatus as above secures continuous recording of the image by rewinding the photosensitive material which has an exposed portion; however, the rewinding is a source of problem. Until a film case 105a will be replaced by a new one, a "set condition" must be maintained wherein the main roller 102 and the nip rollers 106 are in contact with each other. During the set condition, a production cycle described above; precisely, a set of procedures consists of exposure, rewind, normal feed and cut is repeatedly performed in this order. As the repetition of the production cycle increases in number, the set condition gradually deviates from its original state. That is, variation occurs in a size of a loosening which is formed between the main roller 102 and the nip rollers 106.

A possible solution of this is to reset the apparatus to initial state after rewinding a photosensitive material for every production cycle. More precisely, a photosensitive material with an unexposed portion is rewound, for every exposure, so that the leading edge portion thereof retreats to the position of the introduction rollers 101. The image recording apparatus is thus reset to the initial state for every rewind. Consequently, a loosening between the main roller 102 and the nip rollers 106 can be maintained in a predetermined size.

However, this solution invites a deteriorating effect. Time required for producing one photosensitive material sheet, that is, a cycle time becomes long. This would in turn result in a decelerated production efficiency.

SUMMARY OF THE INVENTION

The present invention is directed to an apparatus for recording an image. The image recording apparatus comprises: a feeding unit for feeding a photosensitive material in a first direction; a loosening unit including a travel roller for supporting the photosensitive material from the feeding unit, the travel roller moving between initial and end points in a second direction approximately perpendicular to the first direction in order to form a loosening in the photosensitive material; a first sensor for detecting that the travel roller locates on the end point; a recording unit for recording an image to be reproduced onto the photosensitive material; a cutting unit for cutting off a portion of the photosensitive material, to thereby divide the photosensitive material into a photosensitive material sheet with the reproduced image and an unexposed photosensitive material; and a controller for controlling the feeding, loosening, recording and cutting units which are disposed serially in the first direction, wherein, when the first sensor does not detect at the end of recording that the travel roller locates on the end point, an image to be reproduced next is recorded onto the unexposed photosensitive material by the recording unit after the portion of the photosensitive material is cut off by the cutting unit and then the unexposed photosensitive material is rewound until a leading edge portion of the exposed photosensitive material reaches the recording unit.

The present invention is also directed to a method of recording an image. The method comprises steps of: feeding a photosensitive material in a first direction until a leading edge portion of the photosensitive material reaches a recording position; loosening the photosensitive material in a loosening position to thereby form a loop of the photosensitive material, the loosening position being upstream from the recording position relative to the first direction, a size of the loop being within a predetermined range; recording an image to be reproduced onto the photosensitive material; cutting off a portion of the photosensitive material to divide the photosensitive material into a photosensitive material sheet with the reproduced image and an unexposed photosensitive material; detecting at the end of recording whether a size of the loop is within the range or not; and rewinding the unexposed photosensitive material until a leading edge portion of the unexposed photosensitive material reaches the recording position if it is detected that the size of the loop is within the range, and thereafter recording a next image onto the unexposed photosensitive material.

An object of the present invention is to provide an apparatus for and a method of recording an image in which time required for recording an image onto a photosensitive material is reduced.

Another object is to provide an apparatus for and a method of recording an image in which a photosensitive material is stably fed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
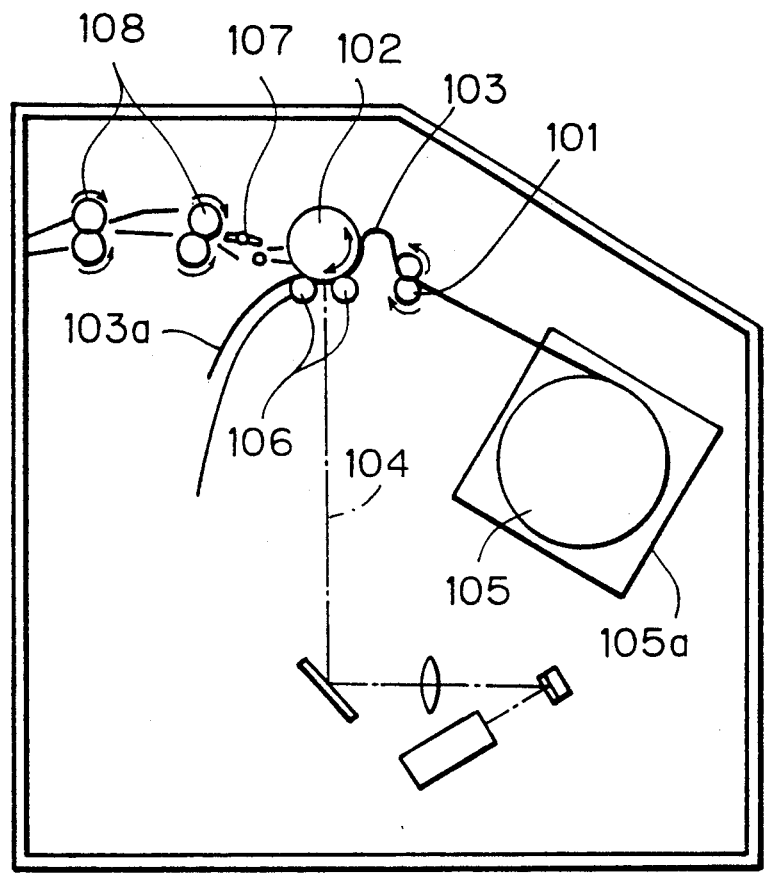
FIG. 1 is a sectional view of a conventional image recording apparatus.
Figure 2:
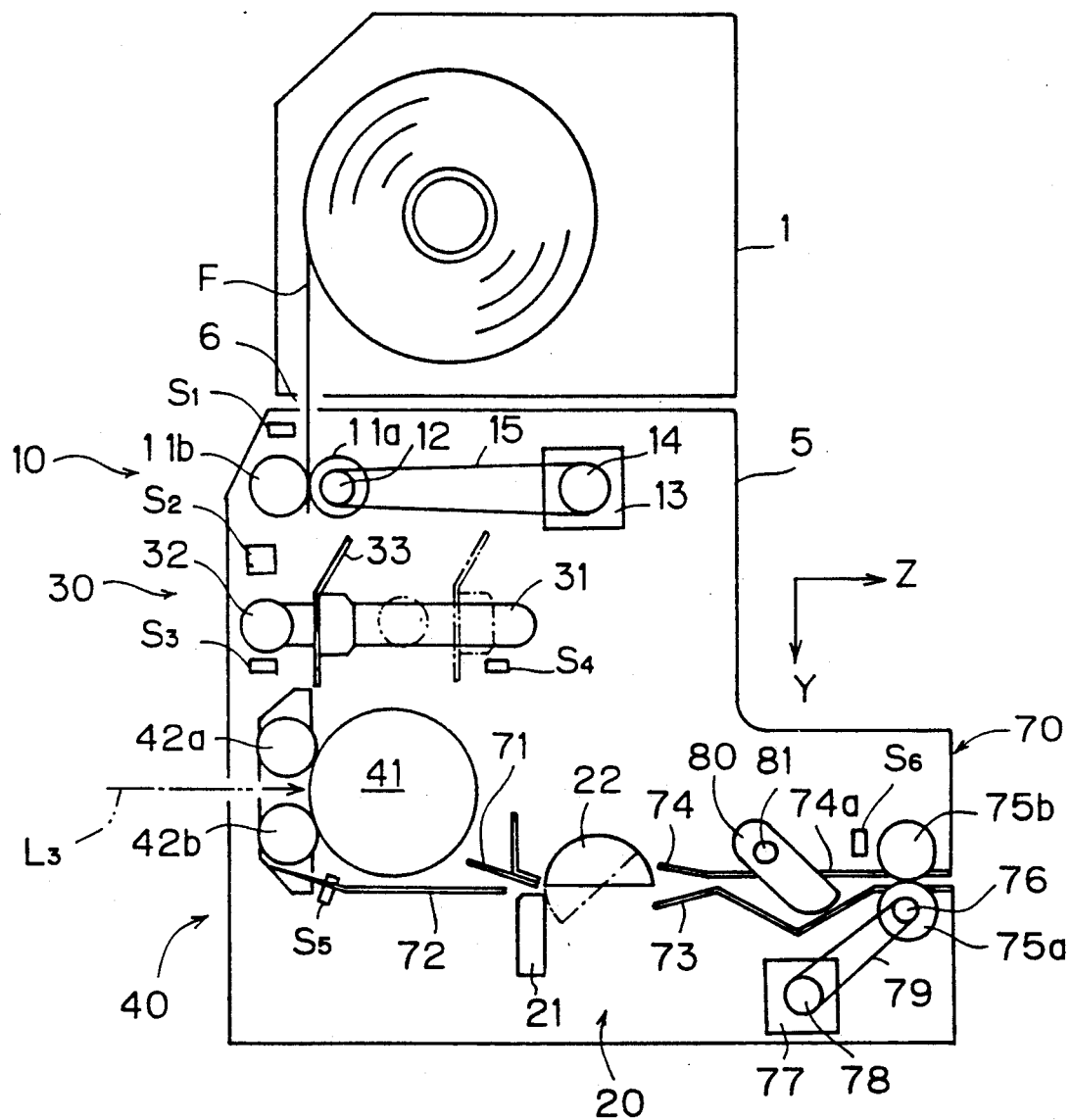
FIGS. 2 and 3 are a schematic side view and a perspective view of an image recording apparatus according to an embodiment of the present invention, respectively.
Figure 3:
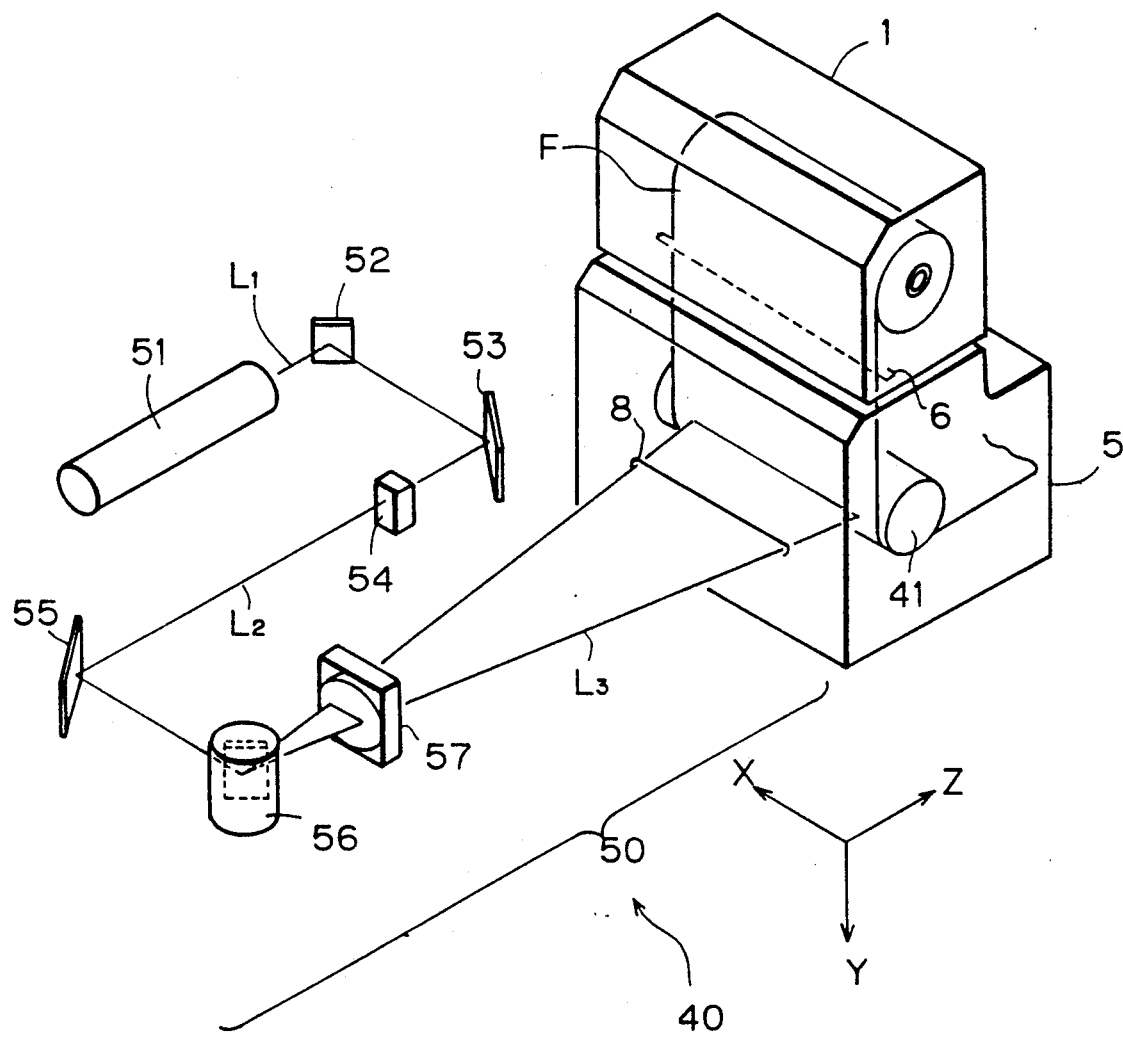

FIGS. 2 and 3 are a schematic side view and a perspective view of an image recording apparatus according to an embodiment of the present invention, respectively.

In FIGS. 2 and 3, a photosensitive material F is fed in a feed scanning direction Y, while scanning a laser beam $L_3$ in a primary scanning direction X which is approximately perpendicular to the direction Y, to thereby record an image on the photosensitive material F.

The image recording apparatus includes: a body 5; an introduction roller unit 10 which feeds in the feed scanning direction Y, the photosensitive material F drawn out of a roll contained in a film case 1; a travel roller unit 30 including a travel roller 32 which allows the photosensitive material F to form a loosening when it moves in a direction Z nearly perpendicular to both the directions X and Y; an expose-scanning unit 40 which feeds the photosensitive material F in the feed scanning direction Y while scanning a laser beam in the primary scanning direction X in order to record an image to be reproduced on the photosensitive material F; a cutter unit 20 which is disposed in a discharging side (downstream side) from the expose-scanning unit 40 and which cuts off the photosensitive material F; and a discharging unit 70 for expelling the photosensitive material F which is cut off in the cutter unit 20. The image recording apparatus also includes a control unit (not shown) disposed separately from the body 5. The control unit governs overall operations of the apparatus based on signals from various sensors and instructions indicated on an operation panel (not shown). Now, each unit will be explained in detail in terms of structure.

In FIG. 2, an opening 6 is provided above the body 5. The position of the opening 6 is aligned precisely to the mounting position of the film case 1. Through the opening 6, the photosensitive material F drawn out of the film case 1 will be guided into the body 5.

The introduction roller unit 10 includes introduction rollers 11a and 11b mounted for free rotation just below the opening 6. The introduction rollers 11a and 11b freely contact with and separate from each other in response to operations of a lever not shown. The introduction roller 11a is linked to a pulley 12, while another pulley 14 is mounted to the rotation shaft of a motor 13 which is secured to the body 5. A belt 15 runs about the pulleys 12 and 14. Hence, when the motor 13 rotates while the introduction rollers 11a and 11b are in contact with each other, the photosensitive material F which has now been drawn into the body 5 will be fed in the feed scanning direction Y while held between the introduction rollers 11a and 11b.

Entry of the photosensitive material F into the body 5 is confirmed by a confirmation sensor $S_1$ displaced between the opening 6 and the introduction roller 11b.

Just beneath the introduction roller unit 10 is disposed a first sensor group $S_2$ for detecting a leading edge portion of the photosensitive material F. The first sensor group $S_2$ serves also as a sensor for detecting a width of the photosensitive material F. There are generally four sizes in a width of the photosensitive material F, namely, six inches (dotted line), eight inches (dashed-and-dotted line), ten inches (dash-and-two-dots line) and twelve inches (dash-and-three-dots line). To deal with the four variations, four sensors $S_{21}$, $S_{22}$, $S_{23}$ and $S_{24}$ are mounted at predetermined intervals to a support member 7 fixed to the body 5. These sensors $S_{21}$, $S_{22}$, $S_{23}$ and $S_{24}$ function as the first sensor group $S_2$ for detecting a leading edge portion.

Figure 4:
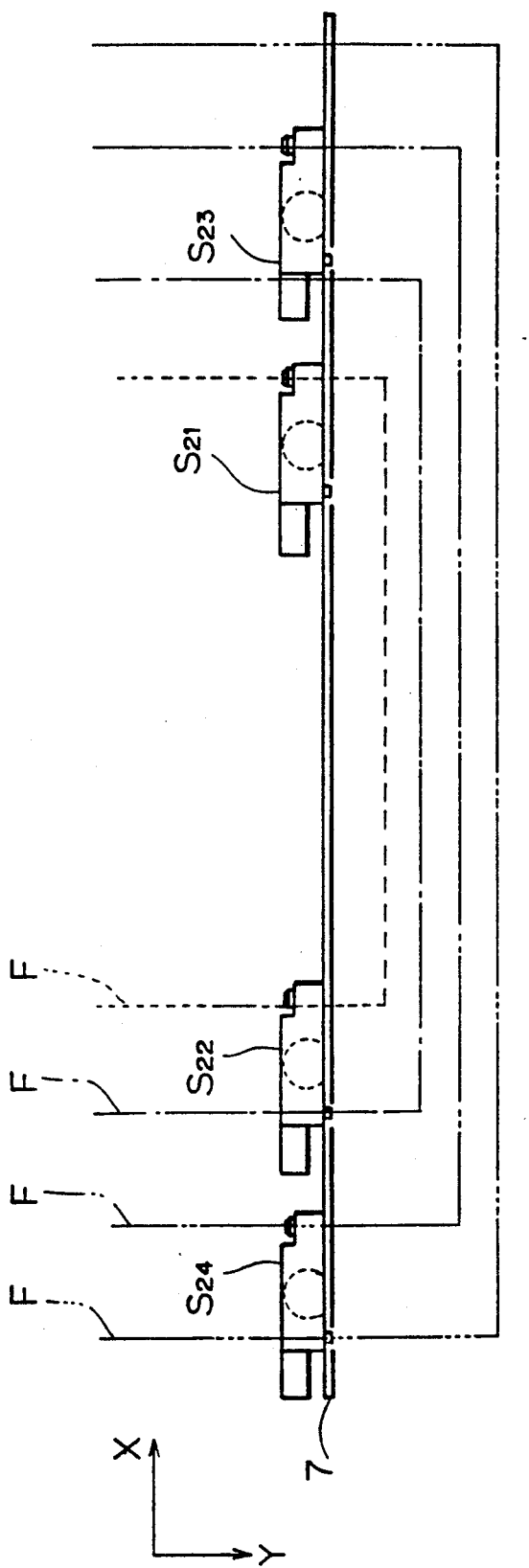
FIG. 4 is a side view of a sensor group for width detection which serves as a first sensor for detecting a leading edge portion of a photosensitive material.

When the photosensitive material F is, for example, eight-inch width, arrival of the leading edge portion thereof at the first sensor group $S_2$ (dashed-and-dotted line of FIG. 4) would turn on the sensors $S_{21}$ and $S_{22}$ out of the four sensors $S_{21}$, $S_{22}$, $S_{23}$ and $S_{24}$. The activated sensors $S_{21}$ and $S_{22}$ release signals to be received in the control unit. Thus, it is automatically found that the photosensitive material F contained within the film case 1 is eight inches in width.

The travel roller unit 30 is located in the vicinity of the first sensor group $S_2$ for detecting a leading edge portion. The travel roller unit 30 includes a travel guide 31 which extends in the Z-direction, the travel guide 31 being secured to the body 5 (FIG. 2). The travel roller 32 and a guide plate 33 are mounted for free slide movement in the Z-direction. The travel roller 32 and the guide plate 33, connected at a given distance therebetween, slides altogether as one along the travel guide 31 upon rotation of a motor (not shown) which is a driving source of the travel roller unit 30. One more explanation about the travel rollers 32 and the travel guide 33 is that the two are kept to stay where they are when the motor is energized, whereas they allowed to move according to outside force onto the same once excitation of the motor has vanished.

A sensor $S_3$ for detecting an initial point and a sensor $S_4$ for detecting an end point are disposed at the left end and the right end of the travel guide 31, respectively. The sensors $S_3$ and $S_4$ detect whether the travel roller 32 and the travel guide 33 are in their initial positions (left end of FIG. 2) or their end positions (right end of FIG. 2).

Near the travel roller unit 30, a main roller 41 of the expose-scanning unit 40 is rotatably mounted to the body 5. Nip rollers 42a and 42b are displaced to face the main roller 41, the nip rollers 42a and 42b being able to freely contact with or separate from the main roller 41.

Figure 5A:
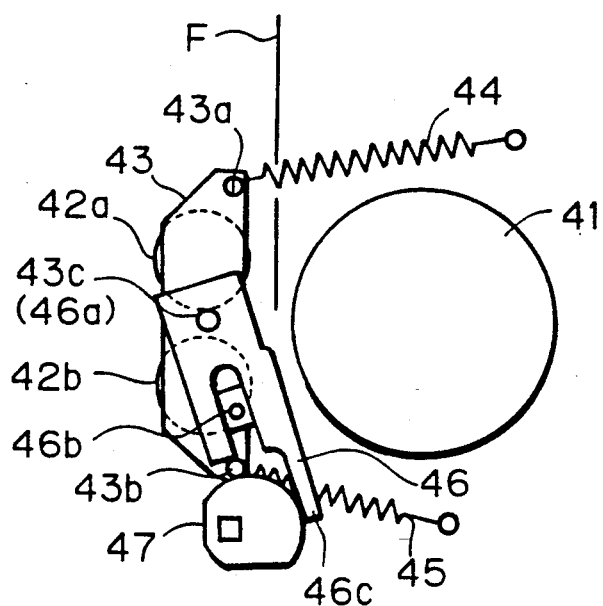
FIGS. 5A and 5B are partially enlarged views of an expose-scanning unit.
Figure 5B:
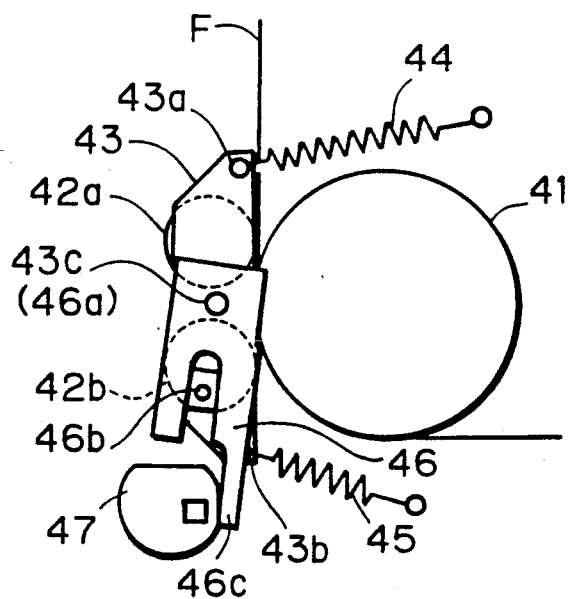
Figure 6A:
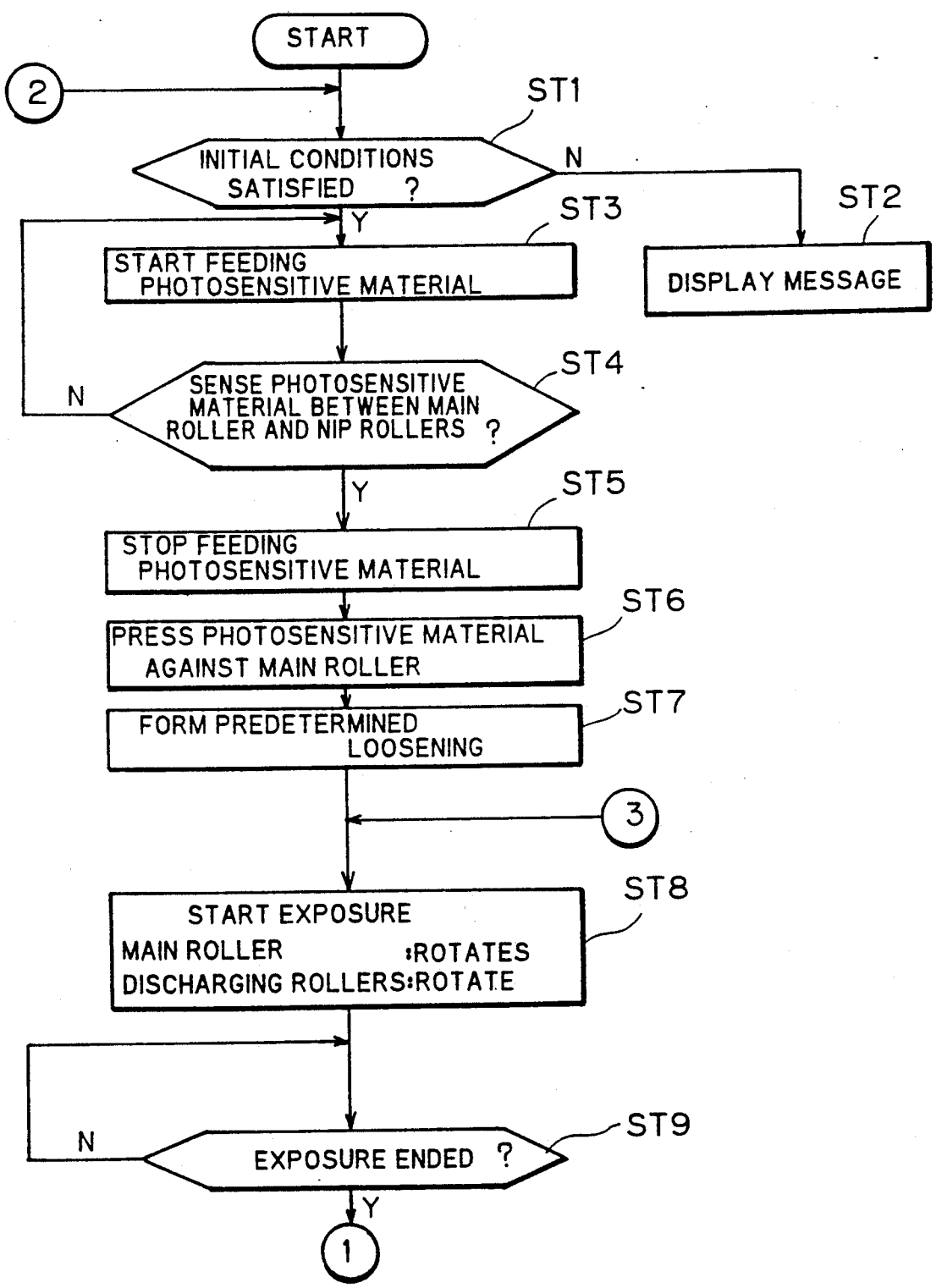
FIGS. 6A, 6B, 6C, 6D and 8 are flow charts explaining operations of the image recording apparatus.
Figure 6B:
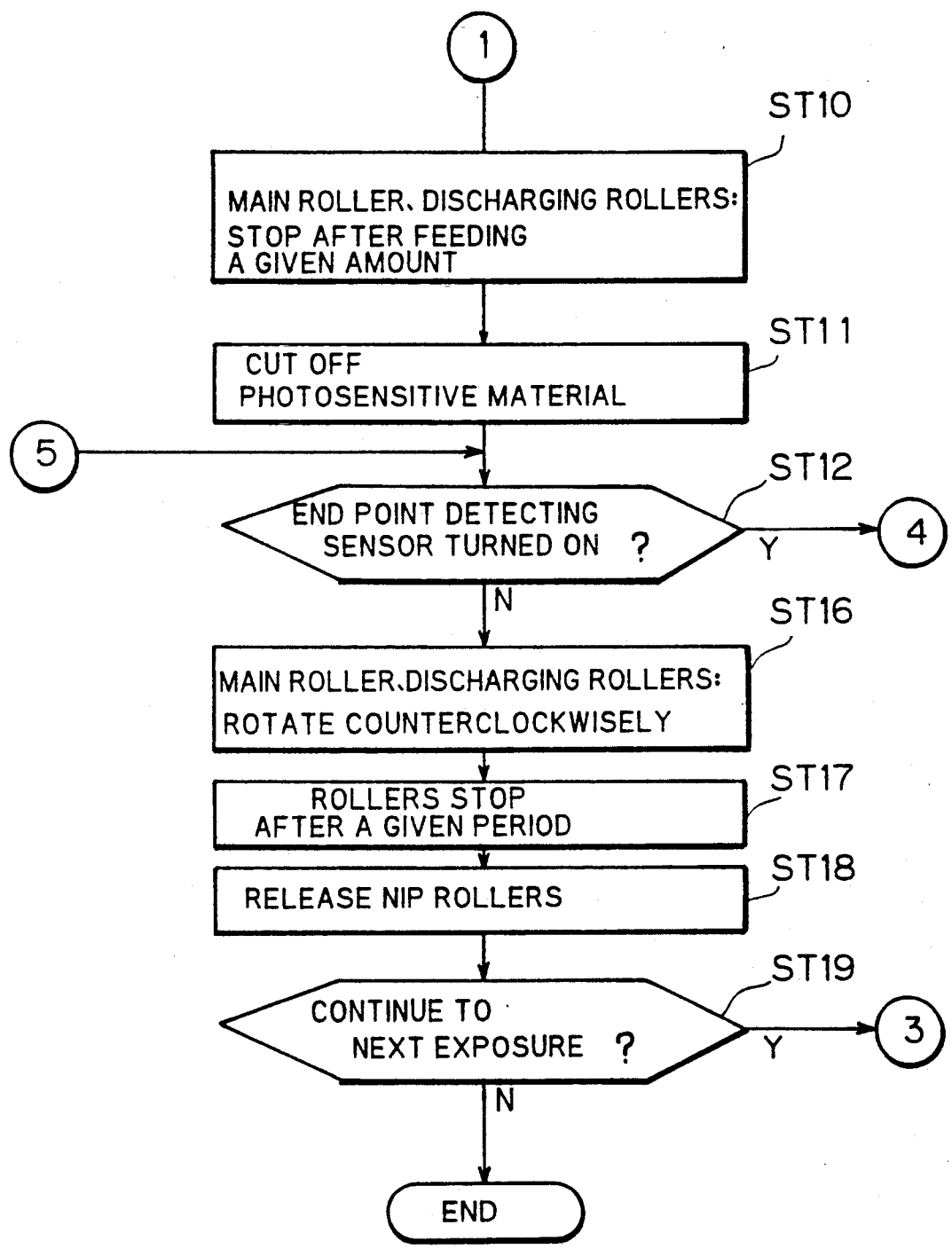
Figure 6C:
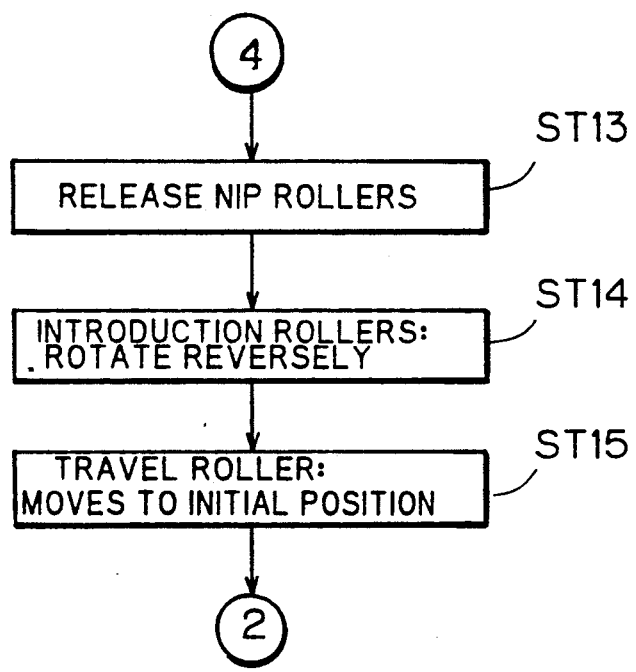
Figure 6D:
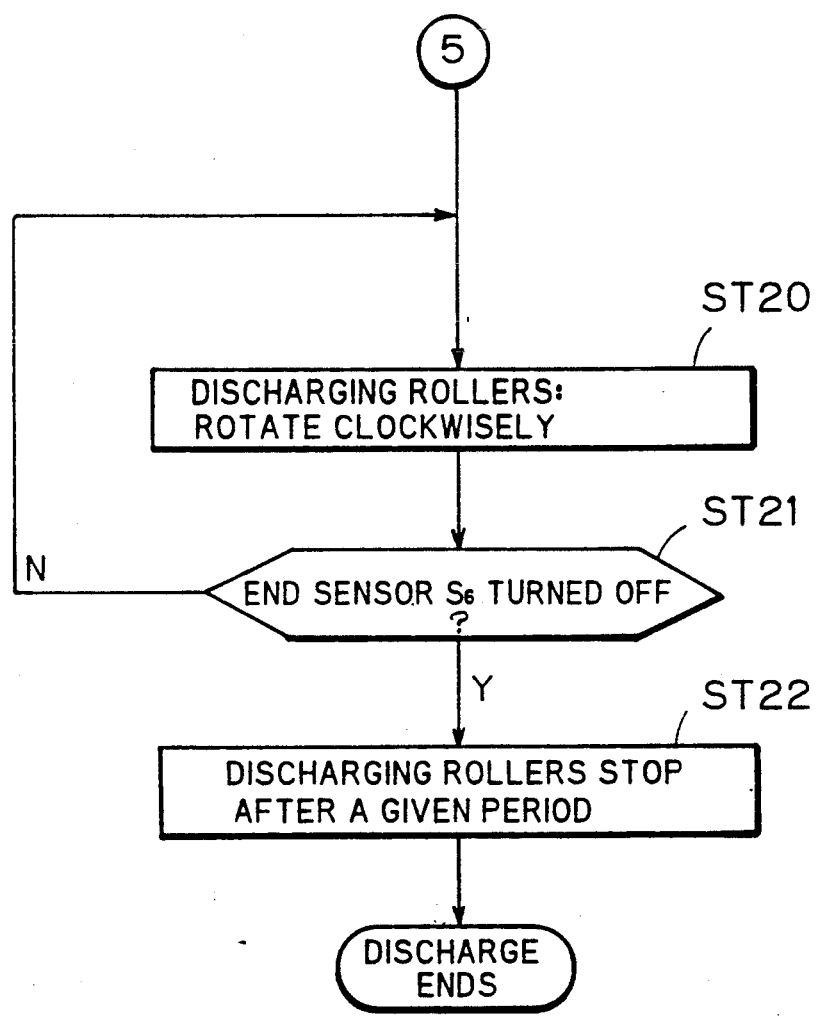

FIGS. 5A and 5B show detailed structures of the nip rollers 42a and 42b. FIG. 5A shows the structure of before the photosensitive material F is urged against the main roller 41 by the nip rollers 42a and 42b, and FIG. 5B that of after the urging.

FIGS. 5A and 5B, the nip roller 42a and 42b are rotatably supported at a predetermined distance therebetween by a trapezoidal member 43. An end portion 43a of the trapezoidal member 43 is connected to an end of a first spring 44 whose another end is secured to the body 5. Likewise, an end portion 43b of the trapezoidal member 43 is connected to an end of a second spring 45 whose another end is secured to the body 5. The pulling force of the second spring 45 is greater than that of the first spring 44.

An end portion 46a of an operation member 46 is connected for rotation to an approximately center portion 43c of the trapezoidal member 43. An approximately center portion 46b of the operation member 46 is connected for rotation to the body 5. An eccentric cam 47 is provided so as to contact with another end portion 46c of the operation member 46. Hence, the operation member 46 rotates about its approximately center portion 46b as the eccentric cam 47 rotates.

In separating the nip rollers 42a and 42b from the main roller 41, the eccentric cam 47 stays in the position shown in FIG. 5A allowing the operation member 46 inclined greatly about the approximately center portion 46b in the counterclock direction. The inclination of the operation member 46 drags the trapezoidal member 43 connected thereto at the end portion 46a to the left side against spring force of the first and the second spring 44 and 45. Thus, the pulling force toward the left forces the nip rollers 42a and 42b to be separated from the main roller 41.

Reversely, if the eccentric cam 47 rotates 180 degrees in the clockwise direction from the position of FIG. 5A to the position of FIG. 5B, the nip rollers 42a and 42b will be urged against the main roller 41. The 180 degree clockwise rotation of the cam 47 allows the springs 44 and 45 to drive the operation member 46 into clockwise rotation about the approximately center portion 46b. As the operation member 46 thus rotates following a varying position of the surface of the eccentric cam 47, the nip rollers 42a and 42b connected with the trapezoidal member 43, urged by the spring force, enter a tight contact with the main roller 41.

A detecting sensor $S_5$ is provided in the vicinity of the nip roller 42b to detect the leading edge of the photosensitive material F.

Now, a scanning unit 50 will be explained which is included in the expose-scanning unit 40. The scanning unit 50 is disposed in a position corresponding to the main roller 41 (FIG. 3). In general structure, the scanning unit 50 is mounted within the body 5, however, the unit is illustrated as being disposed outside the body 5 for the sake of convenience for explanation.

In the scanning unit 50, a laser beam $L_1$ from a laser source 51 hits mirrors 52 and 53 serially and enters an acousto-optic modulating element 54 which determines whether to turn on the laser beam $L_1$ or not according to control signals corresponding to image data. The laser beam, now being a laser beam $L_2$ after modulation, enters through a mirror 55 a deflector such as a Galvano mirror 56 to be deflected thereat. A deflected laser beam $L_3$ is imaged by an $f\theta$ lens 57 onto a surface of the photosensitive material F being fed on the main roller 41. On a side frame of the body 5, an opening 8 is provided which allows the laser beam from the scanning unit 50 into the body 5. In addition, the scanning unit 50 includes a mechanical shutter or an optical shutter disposed on the path of the laser beam, illustration thereof being omitted in FIG. 3.

On the discharging side from the expose-scanning unit 40, an upper guide plate 71 and a lower guide plate 72 are disposed in a vis-á-vis relation. The space between the guide plates 71 and 72 serves as an avenue in which the photosensitive material F advances from the expose-scanning unit 40 toward the cutter unit 20.

The cutter unit 20, as in FIG. 2, virtually consists of a fixed cutter 21 which is fixed to the body 5, a movable cutter 22 having an edge which is in the form of a spiral, and driving means (not shown) for driving the cutter 22 to engage the cutters 21 and 22 with each other and separate the cutters from each other. When the cutters are to be opened, the movable cutter 22 is separated from the fixed cutter 21, with a result that the photosensitive material F is admitted to the avenue (solid line of FIG. 2). On the other hand, when the cutters 21 and 22 are to be closed, the edge of the movable cutter 22 engages with the edge of the fixed cutter 21, cutting off the photosensitive material F (dashed-and-dotted line).

Another pair of guide plates is provided on the discharging side from the cutter unit 20, that is, a lower guide plate 73 which is nearly V-shaped in section and an upper guide plate 74, the guide plates 73 and 74 being in a facing relation. The photosensitive material F conveyed from the cutter 20 will be transported to discharging rollers 75a and 75b through the space between the upper and the lower guide plate 74 and 73. The discharging roller 75a has a pulley 76 connected with its rotation shaft (not shown). A belt 79 runs about the pulley 76 and another pulley 78 which is connected to the rotation shaft (not shown) of a motor 77 for driving rollers.

The upper guide plate 74 is provided with a through hole 74a. Just above the through hole 74a, an upper plate 80 is disposed in such manner that it corresponds to the same. The upper plate 80 is rotatable by its own weight about a pin 81.

An end sensor $S_6$ is provided near the discharging roller 75b. The end sensor $S_6$ detects the end of an exposed photosensitive material sheet manufacturing procedures of which are described below.

The following paragraphs explain procedures of an image to be reproduced on a photosensitive material sheet of a predetermined size by the image recording apparatus heretofore described.

First, an operator mounts the film case 1 in a predetermined position above the body 5. In the film case 1, a photosensitive material F is contained in the form of a roll. The photosensitive material F has a proper size; e.g., eight-inch width. Next, the operator turns a handle (not shown) which is connected to a spindle of the photosensitive material roll F in order to guide the photosensitive material F into the body 5 through the opening 6.

During the entry, the introduction rollers 11a and 11b stay separated from each other. The photosensitive material F is free to pass between the introduction rollers 11a and 11b owing to the absence of intervention by the rollers. On arrival of the leading edge portion of the photosensitive material F at the first sensor group $S_2$ for detecting a leading edge portion (dashed-and-dotted line of FIG. 4), the sensors $S_{21}$ and $S_{22}$ are activated to turn on light emitting diodes mounted to the body 5. Thus, it is detected that the photosensitive material F has reached a predetermined point. Concurrently with the detection, the width of the photosensitive material F is found by signals given to the control unit (not shown) from the sensors $S_{21}$ and $S_{22}$. In this case, the width is found to be eight inches. The width data is stored in a memory of the control unit (not shown).

Thus, according to this embodiment, the first sensor group $S_2$ enables automatic read of width data of the photosensitive material F mounted to an image recording apparatus. This prevents wrong width data from being entered in the control unit. A conventional image recording apparatus is often troubled by incorrect width data stemming from manual input wherein an operator operates an operation panel to input width data in a memory of a control unit. However, this problem can be kept at bay due to the improvement according to the embodiment.

If it is confirmed that the light emitting diodes are turned on, the operator stops turning the handle and then turns a knob (not shown) to bring the introduction rollers 11a and 11b into contact with each other. Having brought into contact, the introduction rollers 11a and 11b firmly hold the photosensitive material F therebetween. Mounting of the eight-inch photosensitive material F is completed in such a manner.

Then, the operator taps a start switch (not shown) on the operation panel. In response to this, the control unit starts governing the respective units of the apparatus to record an image to be reproduced on the photosensitive material F. The following descriptions will explain how the recording proceeds. When summarized in a flow chart, the procedures are as shown in FIGS 6A to 6D.

First, it is detected based on signals from the sensors and the like of the respective units whether or not predetermined initial conditions are satisfied (Step ST1). The initial conditions are: The travel roller 32 and the guide plate 33 are in their initial positions (left end position of FIG. 2); the nip rollers 42a and 42b are both separated from the main roller 41 as shown in FIG. 5A; and the shutter of the scanning unit 50 is closed. If the initial conditions are not satisfied, a display (not shown) of the control unit indicates a message as such (Step ST2).

If the initial conditions are all satisfied, the motor 13 starts up in response to an instruction from the control unit, driving the introduction roller 11a into clockwise rotation. With rotation of the introduction rollers 11a and 11b, the photosensitive material F is started to be fed in the feed scanning direction Y (Step ST3).

The photosensitive material F, passing between the main roller 41 and the nip rollers 42a and 42b, approaches the second sensor $S_5$ for detecting a leading edge portion thereof. When the second sensor $S_5$ detects the leading edge portion of the photosensitive material F (Step ST4), the control unit outputs an instruction to stop the motor 13. Without drive from the motor 13, the introduction rollers 11a and 11b stop feeding the photosensitive material F (Step ST5).

Figure 7A:
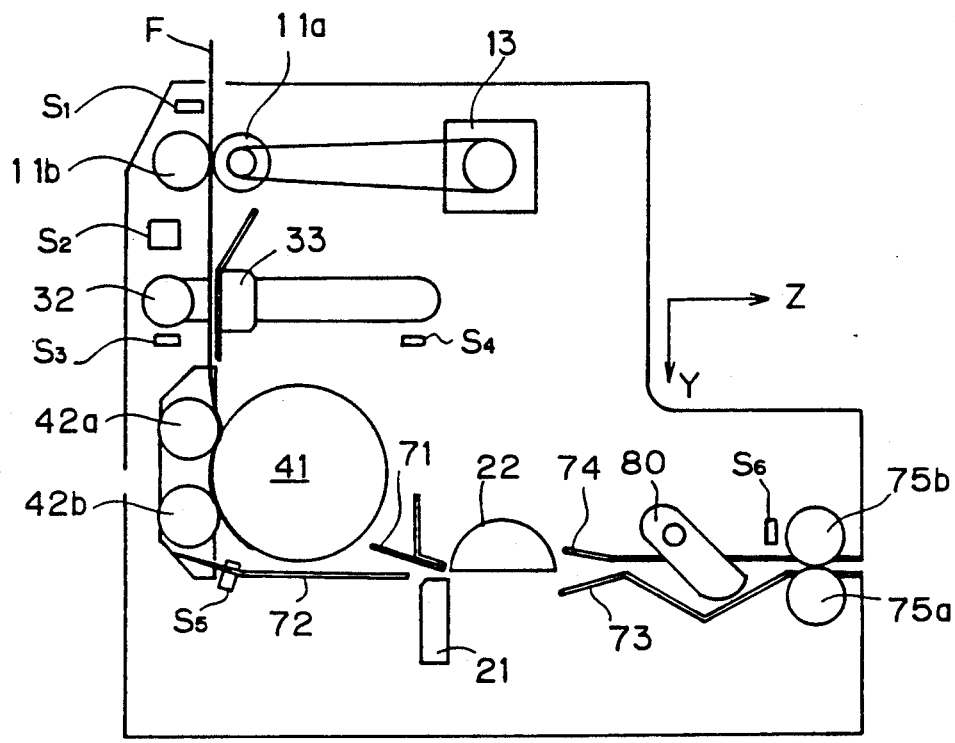
FIGS. 7A to 7F are diagrams explaining the operations of the image recording apparatus.

Next, the eccentric cam 47 rotates 180 degrees in the clockwise direction from its position of FIG. 5A in response to an instruction form the control unit. This eccentric movement of the eccentric cam 47, combined together with force of the springs 44 and 45, drives the operation member 46 into clockwise rotation about the approximately center portion 46b. The clockwise rotation of the operation member 46 in turn hauls the nip rollers 42a and 42b, which are connected with the trapezoidal member 43, toward the main roller 41 (FIG. 5B). Thus, the nip rollers 42a and 42b urge the photosensitive material F against the main roller 41 (Step ST6: FIG. 7A).

Figure 7B:
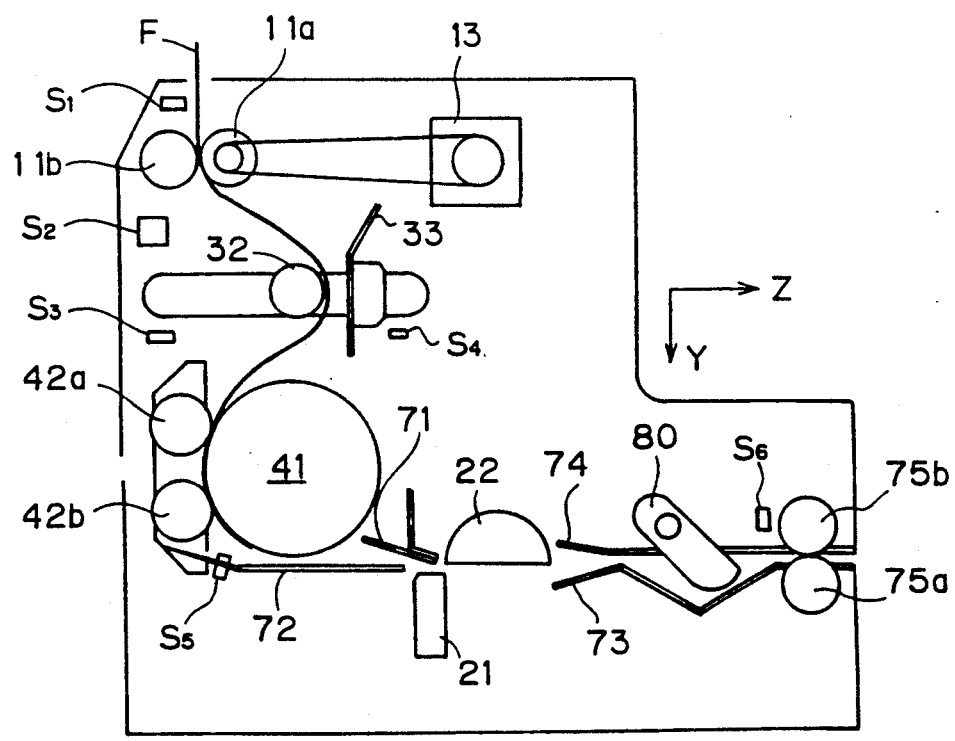

Then, the introduction roller 11a rotates in the clockwise direction once again to feed the photosensitive material F in the feed scanning direction Y. In synchronism with this, the travel roller 32 and the guide plate 33 move in the Z-direction. As a result of this, the photosensitive material F forms a loosening of a predetermined size inside the travel roller unit 30 (Step ST7: FIG. 7B). Thus, the initial state for recording is achieved.

The procedures develop differently depending on whether data representing a size of a loosening has been entered through the operation panel in advance or not. In the former case, rotations of the introduction roller 11a or the motor 13 are counted in relation to a growth pace in size of a loosening. Then, the introduction roller 11a rotates until a growing size of a loosening coincides with the size which has been entered beforehand. In the latter case, the introduction roller 11a stops rotating when the photosensitive material F has been fed by a length which was preliminarily determined so as to comply with the initial state.

Following the achievement of the initial state, the shutter of the scanning unit 50 opens up. In response to this, the main roller 41 and the discharging roller 75a start rotating at the same time, starting off the feed of the photosensitive material F in the feed scanning direction Y (Step ST8). In driving the discharging roller 75a, the rotary speed thereof is set 10 percent slower than that of the main roller 41 in order to form a loosening in the discharging unit 70.

In synchronism with the rotation of the main roller 41, the laser beam $L_3$, which has been modulated based on image signals from the control unit, from the scanning unit 50 scans the photosensitive material F in the primary feeding direction X, whereby an image is recorded on the photosensitive material F.

Also with synchronism with the rotation of the main roller 41, the introduction roller 11a rotates clockwisely. During rotation of these rollers, the travel roller 32 and the guide plate 33 are free to slide sidewise (i.e., in the Z-direction). In addition, the feeding speed of the introduction roller unit 10 is equal to or over the feeding speed of the main roller 41. This allows a loosening within the travel roller unit 30 to grow in size at a certain fixed rate or an accelerating rate according to advancement of exposure.

Where a loosening gradually grows in size as exposure advances, the size increase would push the travel roller 32 and the guide plate 33 sidewisely, eventually to the right most position of the travel guide 31. However, this would not develop into a serious problem in actual recording. Recording proceeds without cease even when the travel roller 32 and the guide plate 33 are in the right most position and the sensor $S_4$ for detecting an end point is turned on. Of course, it is optional to adjust the feeding speed of the introduction roller unit 10 in order to constrain in a certain range a size of a loosening formed within the travel roller unit 30.

Figure 7C:
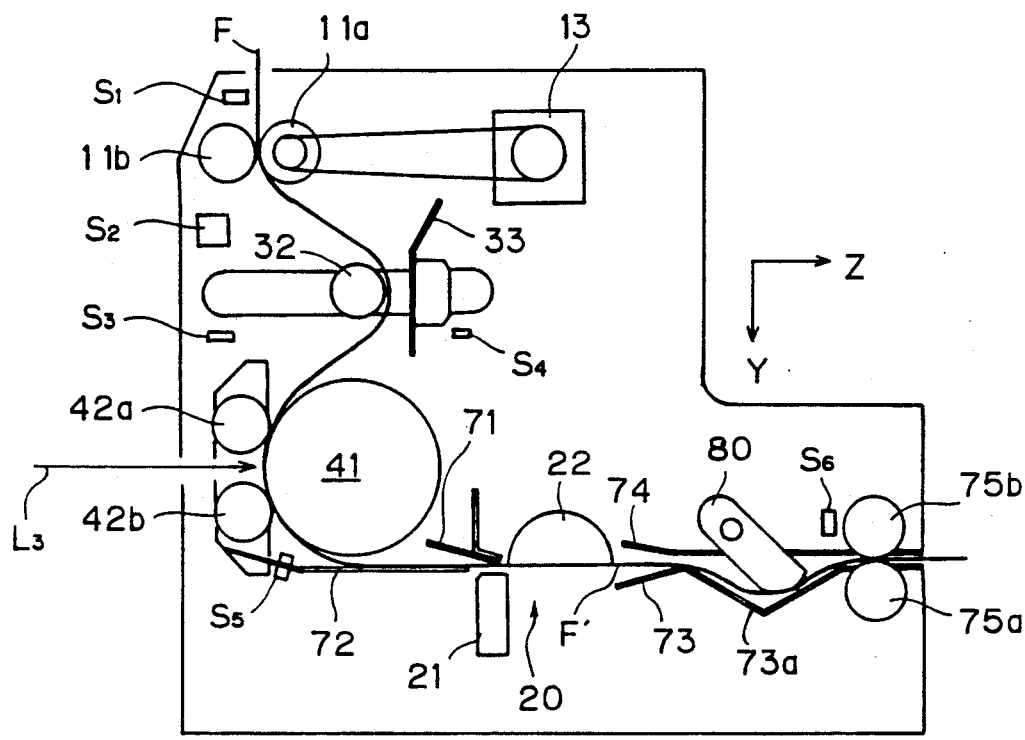
Figure 7D:
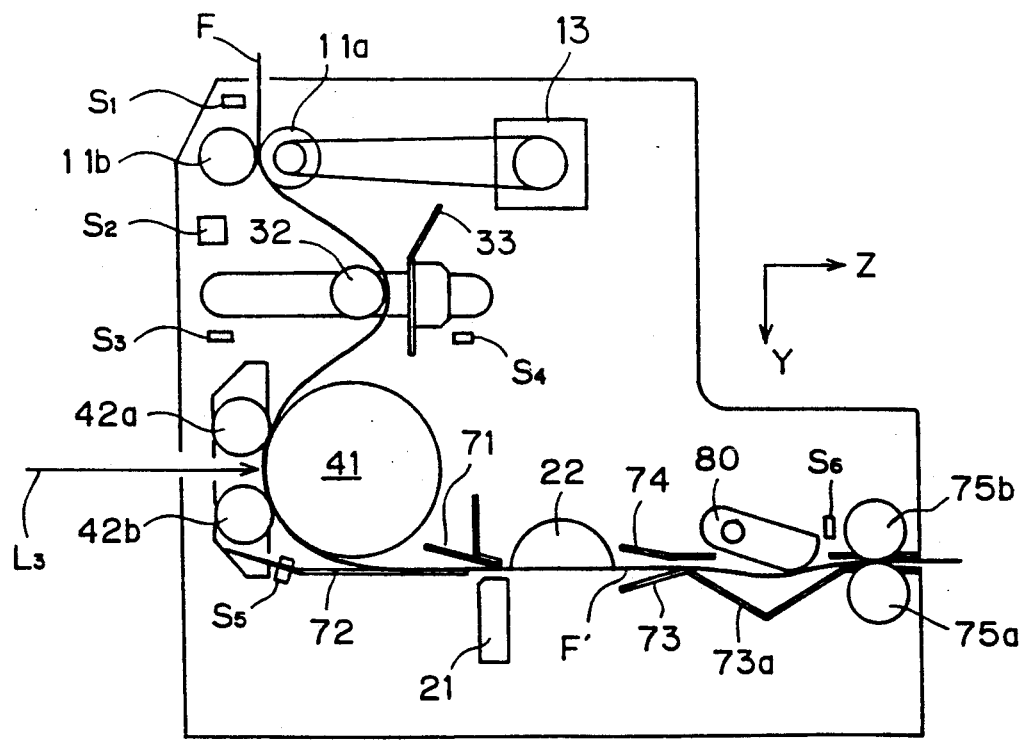

Feed of an exposed photosensitive material F' continues whole through ceaseless recording as above. The exposed photosensitive material F' is kept to be fed toward the discharging rollers 75a and 75b, advancing a path between the upper and the lower guide plate 71 and 72, between the cutters 21 and 22 and further between the upper and lower guide plate 74 and 73 (FIGS. 7C and 7D). During feeding, the exposed photosensitive material F' maintains its loosening within the discharging unit 70 in a proper size until its discharge by means of the discharging rollers 75a and 75b, the manner wherein a loosening is maintained being as below.

The feeding speed of the discharging roller 75a is about 10 percent slower than that of the main roller 41 as mentioned before. This leads to a situation where a loosening is formed in a V-shaped zone 73a of the lower guide plate 73 (FIG. 7C). As the loosening grows, the upper plate 80 sinks by its own weight down to a predetermined position. When a sensor for detecting a loosening (not shown) provided near the upper plate 80 detects this, the discharging roller 75a is allowed to rotate, just oppositely to the previous, at a feeding speed approximately 10 percent faster than the feeding speed of the main roller 41. As this result, the loosening in the V-shaped zone 73a would gradually disappear in accordance with advancement of the recording, whereby the photosensitive material F' in the V-shaped zone 73a pushs up the upper plate 80 to a predetermined position (FIG. 7D). When the loosening detecting sensor detects this, the discharging roller 75a starts rotating at a feeding speed roughly 10 percent slower than the feeding speed of the main roller 41 once again. Thus, the feeding speed of discharging roller 75a is under continuous control, to thereby maintain a size of a loosening in the V-shaped zone 73a within a certain range.

As heretofore described, loosenings are formed both in the travel roller unit 30 and in the discharging unit 70. This allows the apparatus to apply no unwanted stress to the photosensitive material F, which promises favorable recording.

Next, the accomplishment of recording is detected (Step ST9). Upon detection, the shutter is closed, the main roller 41 and the discharging roller 75a rotate in their normal directions to feed the photosensitive material F by a predetermined length until the end of exposed portion of the photosensitive material F returns to the cutting position of the cutter unit 20 (Step ST10).

Then, the cutter unit 20 cuts off the photosensitive material F (Step ST11), dividing the same into the portion with the image recorded thereon (referred to as "exposed sheet FP") and the unexposed portion (referred to as "remaining material FR").

Following this, it is detected whether or not the sensor $S_4$ for detecting an end point is turned on (Step ST12). That is, it is detected whether or not the travel roller 32 and the guide plate 33 are in the right most position of the travel guide.

Figure 7E:
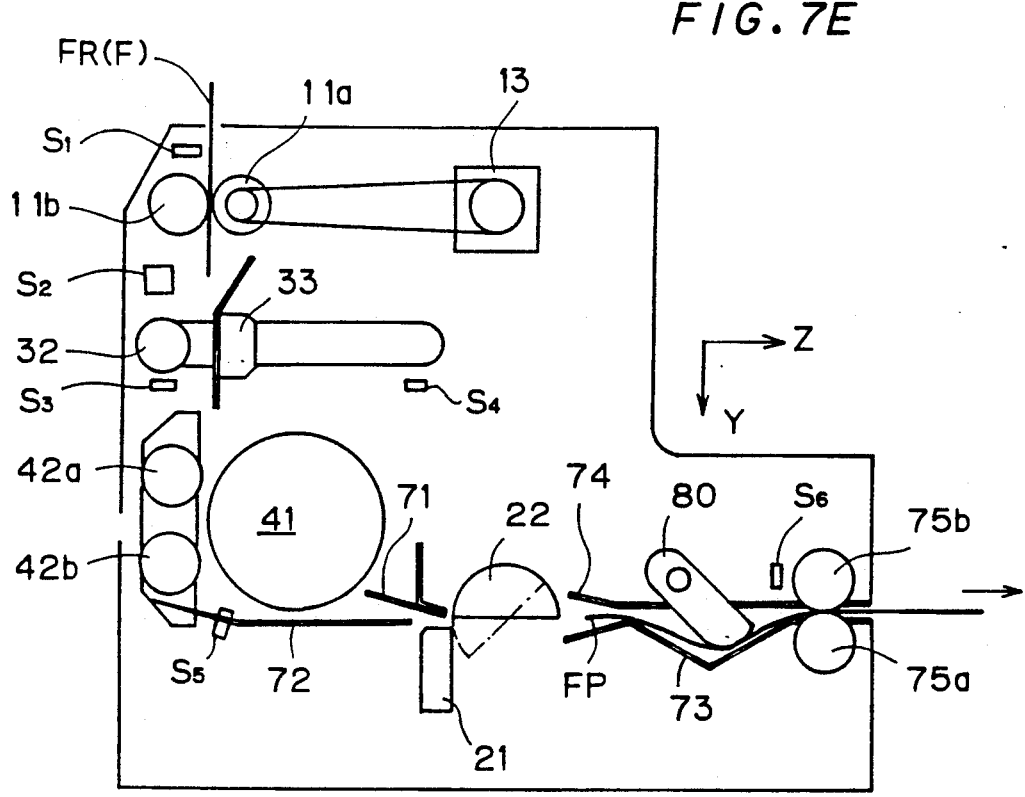

In the step ST12, if the result is "YES," i.e., if the travel roller 32 and the guide plate 33 are in the end most position, the apparatus is reset to the initial state. Precisely, the nip rollers 42a and 42b are released, first (Step ST13). Then, the introduction roller 11a rotates reversely by a predetermined amount while the travel roller 32 and the guide plate 33 are allowed free slide movement in the Z-direction (Step ST14). Under such environments, the remaining material FR is fed backward until the leading edge portion thereof reaches the position of the first sensor group $S_2$. The motor of the travel roller unit 30 then rotates to send the travel roller 32 and the guide plate 33 to the position of the sensor $S_3$ for detecting a start point, namely, the initial position (Step ST15: FIG. 7E). After this, the apparatus will follow the manufacturing procedures from the step ST1 again.

Figure 7F:
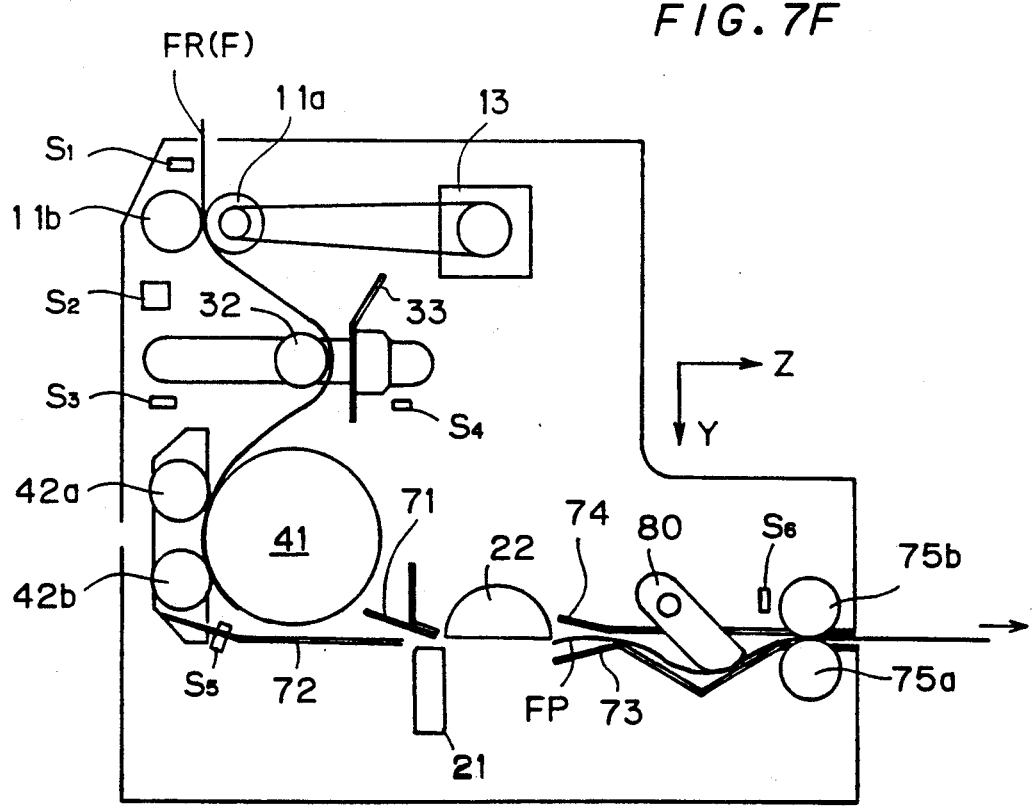

On the other hand, if the result of the step ST12 is "NO," i.e., if the travel roller 32 and the guide plate 33 are between the initial point and the end point of the travel guide, rewind of the remaining material FR would be preformed. First, the main roller 41 and the introduction roller 11a reversely rotate in synchronism for a given period of time (Steps ST16 to ST17). Owing to rotation of the rollers, the remaining material FR moves backward until the leading edge portion thereof reaches the position of the second sensor group $S_5$ for detecting a leading edge portion (FIG. 7F). During the rewind, the travel roller 32 and the guide plate 33 are kept to stay where they are. Then, the nip rollers 42a and 42b are temporarily released (Step ST18). Immediately upon the release, the nip rollers 42a and 42b are urged into contact with the main roller 41, whereby the remaining material FR is prevented from winding. When it is decided to continue recording (Step ST19), the apparatus will go back to the step ST8 and repeat the manufacturing procedures.

Additionally describing, the rewind of the remaining material is conducted in parallel with discharge of exposed sheets FP (Steps ST20 to ST22). In other words, the discharging roller 75a rotates in the normal direction to continuously discharge the exposed sheets FP without intervals (Step ST20). When the end of the exposed sheet FP is passed under the sensor $S_6$, the sensor $S_6$ staying activated turns off (Step ST21). On the detection, the control unit waits for a given period of time required to completely discharge the exposed sheets FP from the body 5 and releases an instruction which stops rotation of the discharging roller 75a (Step ST22). Discharge of the exposed sheets FP is thus completed.

Attention is directed again to that, according to this embodiment, it is detected at each end of recording whether the sensor $S_4$ for detecting an end point is turned on or not (Step ST12) and the position of the travel roller 32 is in a predetermined range. In short, if it is confirmed that a size of a loosening in the travel roller unit 30 is within a predetermined range, the next recording is started swiftly without the reset operations (Steps ST1 to ST7). Thus, a cycle time is shorter compared to where every completion of recording requires an image recording apparatus to be reset to the initial state as is often the case in the prior art.

The present invention is still further advantageous. In mounting the film case 1 containing a photosensitive material roll F to the body 5, a problem often arises is that the leading edge portion portion of the photosensitive material F is exposed by mistake. The image recording apparatus of the present invention copes with this problem by performing so called "head cutting."

Figure 8:
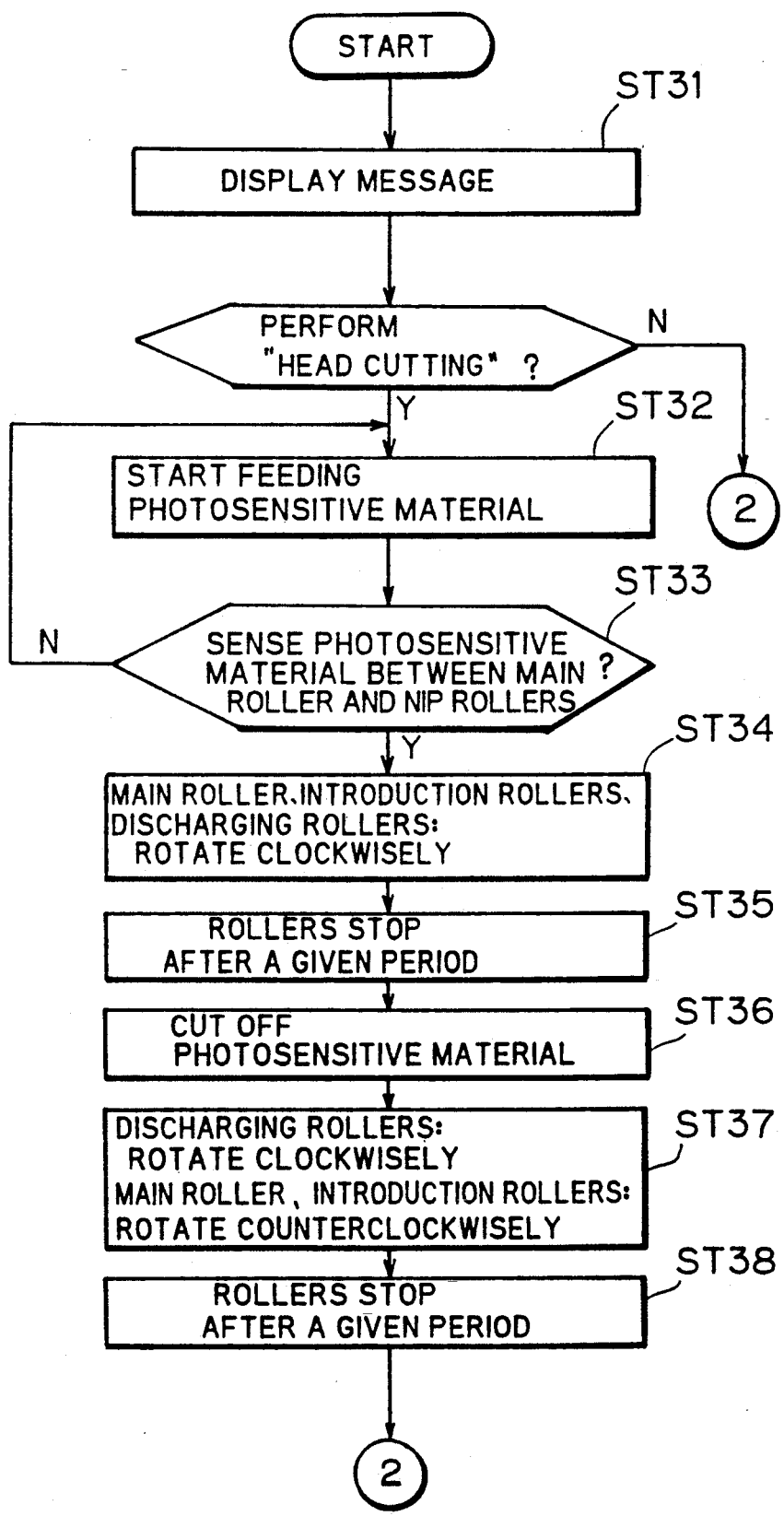

FIG. 8 is a flowchart explaining the procedures of "head cutting." When the operator has set a photosensitive material F in the form of a roll to the apparatus in a manner as described before, the control unit shows on its display a message which asks whether "head cutting" must be performed or not (Step ST31). If the operator decides not to perform the head cutting and pushes the start switch, the apparatus starts continuous production of predetermined-size exposed sheets on which an image to be reproduced is recorded, the manufacturing procedures being as heretofore described.

On the other hand, if the head cutting is needed, the operator pushes a start switch for starting off the head cutting. In response to this, the introduction rollers 11a and 11b start feeding the photosensitive material F in the feed scanning direction Y while firmly holding the same therebetween (Step ST32). The introduction rollers 11a and 11b keep feeding the photosensitive material F until the second sensor $S_5$ for detecting a leading edge portion detects that the leading edge portion of the photosensitive material F has reached the space between the main roller 41 and the nip rollers 42a and 42b (Step ST33).

After this stage, the nip rollers 42a and 42b urge the photosensitive material F against the main roller 41 in a manner as described before. Then, the main roller 41, the introduction roller 11a and the discharging roller 75a simultaneously start rotating in their normal directions (Step ST34). The control unit gives out a stop instruction when the photosensitive material F has been fed by a predetermined distance which enables the accidentally exposed portion of the leading edge, which has passed the cutter unit 20, to reach a contacting area of the discharging rollers 75a and 75b. In responding to the stop instruction, the main roller 41, the introduction roller 11a and the discharging roller 75a stop feeding the photosensitive material F (Step ST35).

After the rollers stopped, the leading edge portion is cut off by the cutter unit 20 (Step ST36) to separate the exposed portion.

Then, the discharging roller 75a resumes its normal-direction rotation (Step ST37), discharging the separated portion out of the image recording apparatus. At the same time, the main roller 41 and the introduction roller 11a start rotating reversely to rewind the photosensitive material F as now includes no exposed portion until the leading edge portion returns to the position of the first sensor group $S_2$ for detecting a leading edge portion.

Thus, the head cutting is completed (Step ST38), and the apparatus starts recording an image onto the photosensitive material F.

While the invention has been shown and described in detail, the foregoing description is in all aspects illustrative and not restrictive. It is therefore understood that numerous modifications and variations can be devised without departing from the scope of the invention.

What is claimed is:

1. An apparatus for recording an image, comprising:
   a feeding unit for feeding a photosensitive material in a first direction;
   a loosening unit including a travel roller for supporting said photosensitive material from said feeding unit, said travel roller moving between initial and end points in a second direction approximately perpendicular to the first direction in order to form a loosening in said photosensitive material;
   a first sensor for detecting that said travel roller locates on the end point;
   a recording unit for recording an image to be reproduced onto said photosensitive material;
   a cutting unit for cutting off a portion of said photosensitive material, to thereby divide said photosensitive material into a photosensitive material sheet with the reproduced image and an unexposed photosensitive material; and
   a controller for controlling said feeding, loosening, recording and cutting units which are disposed serially in the first direction,
   wherein, when said first sensor does not detect at the end of recording that said travel roller locates on the end point, an image to be reproduced next is recorded onto said unexposed photosensitive material by said recording unit after said portion of said photosensitive material is cut off by said cutting unit and then said unexposed photosensitive material is rewound until a leading edge portion of said exposed photosensitive material reaches said recording unit.

2. An apparatus in accordance with claim 1, further comprising a second sensor for detecting a leading edge portion of said photosensitive material from said feeding unit, said second sensor disposed between said feeding unit and said recording unit.

3. An apparatus in accordance with claim 2, further comprising a third sensor for detecting that said travel roller locates on the initial point.

4. An apparatus in accordance with claim 3, wherein, when said first sensor does not detect at the end of recording that said travel roller locates on the end point, said portion of said photosensitive material is cut off by said cutting unit, said unexposed photosensitive material is then rewound until a leading edge portion of said exposed photosensitive material reaches said second sensor while said travel roller moving to the initial point, and then said travel roller moves toward the end point to thereby form a loosening in said unexposed photosensitive material, thereafter an image to be reproduced next is recorded onto said unexposed photosensitive material by said recording unit.

5. An apparatus in accordance with claim 1, further comprising a discharging unit for expelling said photosensitive material sheet with the reproduced image from the apparatus, said discharging unit disposed downstream from said cutting unit relative to said first direction.

6. An apparatus in accordance with claim 5, wherein a photosensitive material from said cutting unit is transported in the first direction while said photosensitive material loosening.

7. A Method of recording an image, comprising steps of:
feeding a photosensitive material in a first direction until a leading edge portion of said photosensitive material reaches a recording position;
loosening said photosensitive material in a loosening position to thereby form a loop of said photosensitive material, the loosening position being upstream from the recording position relative to said first direction, a size of said loop being within a predetermined range;
recording an image to be reproduced onto said photosensitive material;
cutting off a portion of said photosensitive material to divide said photosensitive material into a photosensitive material sheet with the reproduced image and an unexposed photosensitive material;
detecting at the end of recording whether a size of said loop is within the range or not; and
rewinding said unexposed photosensitive material until a leading edge portion of said unexposed photosensitive material reaches the recording position if it is detected that the size of said loop is within the range, and thereafter recording a next image onto said unexposed photosensitive material.

8. A method in accordance with claim 7, further comprising steps of:
rewinding said unexposed photosensitive material until a leading edge portion of said unexposed photosensitive material reaches an initial position while the size of said loop is decreasing if it is detected that the size of said loop becomes an allowable maximum, the initial position being upstream from the loosening position relative to said first direction;
loosening said unexposed photosensitive material in the loosening position to thereby form a loop of said unexposed photosensitive material, a size of said loop being within a predetermined range; and
recording an image to be reproduced next onto said unexposed photosensitive material.

* * * * *